(12) United States Patent
Hall

(10) Patent No.: US 7,198,453 B2
(45) Date of Patent: Apr. 3, 2007

(54) OFFSHORE STRUCTURE SUPPORT AND FOUNDATION FOR USE WITH A WIND TURBINE AND AN ASSOCIATED METHOD OF ASSEMBLY

(75) Inventor: Rudolph A. Hall, Madisonville, LA (US)

(73) Assignee: Keystone Engineering, Inc., Metairie, LA (US)

( * ) Notice: Subject to any disclaimer, the term of this patent is extended or adjusted under 35 U.S.C. 154(b) by 86 days.

(21) Appl. No.: 11/014,908

(22) Filed: Dec. 20, 2004

(65) Prior Publication Data

US 2006/0104821 A1 May 18, 2006

Related U.S. Application Data

(60) Provisional application No. 60/626,912, filed on Nov. 12, 2004.

(51) Int. Cl.
*F03D 11/04* (2006.01)
(52) U.S. Cl. ............... 415/4.3; 416/244 A; 416/DIG. 6
(58) Field of Classification Search ............ 416/244 A, 416/244 R, DIG. 6; 415/4.3, 4.5, 3.1, 213.1, 415/908
See application file for complete search history.

(56) References Cited

U.S. PATENT DOCUMENTS

| | | | |
|---|---|---|---|
| 2,710,733 A | 6/1955 | Phillips | |
| 3,643,447 A | 2/1972 | Pogonowski | |
| 3,745,777 A | 7/1973 | Blenkarn | |
| 3,805,534 A | 4/1974 | Brasted | |
| 3,974,657 A | 8/1976 | Sumner | |
| 4,723,875 A | 2/1988 | Sutton | |
| 4,973,198 A | 11/1990 | Cox | |
| 5,029,795 A | 7/1991 | Dexter | |
| 5,051,036 A | 9/1991 | Gomez De Rosas et al. | |
| 5,669,735 A | 9/1997 | Blandford | |
| 5,851,052 A | 12/1998 | Gustafsson | |
| 6,299,385 B1 | 10/2001 | Barnes | |
| 6,439,832 B1* | 8/2002 | Siegfriedsen | 415/4.3 |
| 6,783,305 B2 | 8/2004 | Hall et al. | |
| 6,979,171 B2* | 12/2005 | Lauritsen | 415/4.3 |
| 2002/0190168 A1* | 12/2002 | Hall et al. | 248/188.7 |
| 2003/0151260 A1* | 8/2003 | Siegfriedsen | 290/44 |
| 2005/0163616 A1* | 7/2005 | Mortensen | 416/132 B |

FOREIGN PATENT DOCUMENTS

| | | |
|---|---|---|
| FR | 1 450 410 A | 6/1966 |
| GB | 1 395 297 A | 5/1975 |

OTHER PUBLICATIONS

"Wind Power for Old Oil Rigs", Jul. 9, 2004, <http://www.energybulletin.net/1011.html>.*
Abandoned Rigs Could House Wind Farm; Richard Slawsky; Sep. 2004.

* cited by examiner

*Primary Examiner*—Edward K. Look
*Assistant Examiner*—Nathan Wiehe
(74) *Attorney, Agent, or Firm*—Nixon Peabody LLP; Donald R. Studebaker

(57) ABSTRACT

A pile based braced caisson structural support device includes a number of legs in is used to support a wind turbine. The wind turbine includes a base, a turbine generator and a blade mechanism. The legs are configured in a teepee type configuration such that the footprint of the base is larger than the footprint of the opposing end. This structural support can be used as a base for an offshore platform in that the support reduces the lateral forces on the support caused by wave action.

12 Claims, 22 Drawing Sheets

OFFSHORE STRUCTURE SUPPORT AND FOUNDATION FOR USE WITH A WIND TURBINE AND AN ASSOCIATED METHOD OF ASSEMBLY

This application claims priority to U.S. Provisional Application No. 60/626,912, filed on Nov. 12, 2004, which is incorporated herein by reference in its entirety.

BACKGROUND OF THE INVENTION

1. Field of the Invention

This invention generally relates to structural supports. In particular, this invention relates to structural supports for, for example, wind turbines, or the like.

2. Description of Related Art

Conventional offshore platforms have deck legs that are vertical or are battered outward as they extend downwards. The conventional arrangement provides structurally efficient support for the deck but the associated dimensions of the platform at the water surface result in increased expense for the platform.

Wind turbines have traditionally been supported on mono-piles when placed offshore. However, recently, efforts have taken place to position wind turbines in deeper water (approximately six to seven or more miles offshore) in part to increase the aesthetics of the view from the shoreline. However, with the movement of wind turbines further offshore, the employment of mono-piles as the base on which wind turbines are placed has become less cost effective.

SUMMARY OF THE INVENTION

Accordingly, the present invention is directed to a wind turbine in combination with a structure support that provides a sturdy and cost effective support even in deep waters. This combination includes a wind turbine comprising a base and a blade mechanism. The structure support further includes at least three elements configured in a substantially teepee shaped configuration, where the at least three elements encompassing a substantially vertical member. A first end of the at least three elements is capable of being affixed to a structure and a second end of the at least three elements adapted to be in contact with a surface. The at least three elements intersect between the first end and the second end. The combination also includes a mounting flange connecting the structure support to the wind turbine.

In accordance with a further embodiment of the present invention the at least three elements intersect above a waterline or at a waterline.

In accordance with another exemplary aspect of the present invention, a method of constructing a wind turbine on a structure support is disclosed. At least three legs are provided in a teepee configuration. A first end of the first three legs are placed on a mounting surface and a deck is affixed to a second end of the at least three legs. A wind turbine mounting flange is affixed to the structure and a base is affixed to the mounting frame and turbine element is affixed to the base. A blade mechanism affixed to the turbine element.

These and other features and advantages of this invention are described in or are apparent from the following detailed description of the embodiments.

BRIEF DESCRIPTION OF THE DRAWINGS

The embodiments of the invention will be described in detail, with reference to the following figures, wherein.

DETAILED DESCRIPTION OF THE INVENTION

The exemplary embodiments of this invention will be described in relation to a support structure, such as an oil and gas platform or a platform for the placement of additional structures, supported by three piles and a central vertical member, such as drill pipe. However, to avoid unnecessarily obscuring the present invention, the following description omits well-known structures and devices that may be shown in block diagram form or otherwise summarized. For the purposes of explanation, numerous specific details are set forth in order to provide a thorough understanding of the present invention. It should be appreciated that the present invention may be practiced in a variety of ways beyond these specific details. For example, the systems and methods of this invention can be generally expanded and applied to support any type of structure. Furthermore, while exemplary distances and scales are shown in the figures, it is to be appreciated the systems and methods of this invention can be varied to fit any particular implementation.

Figure 1:
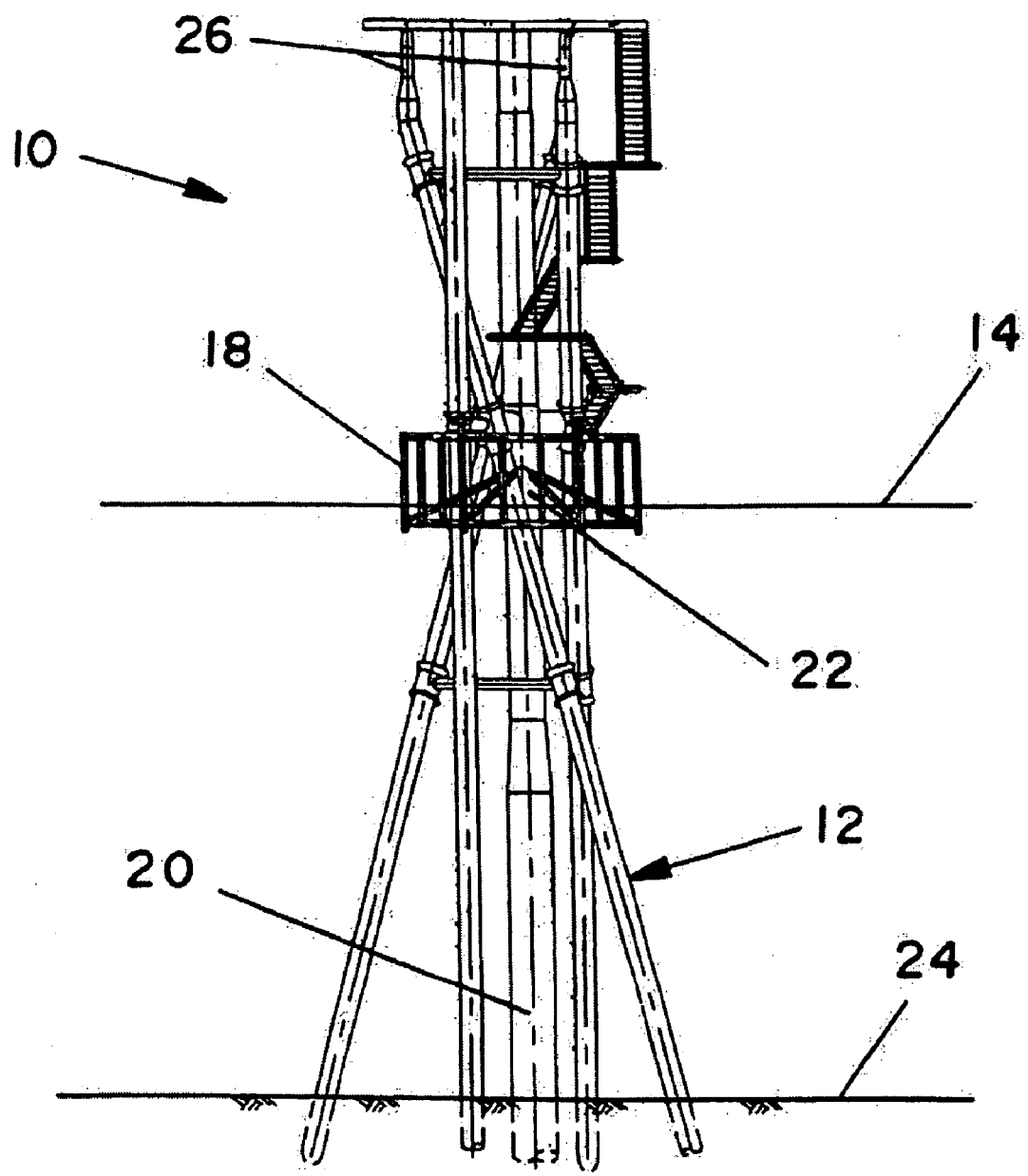
FIG. 1 is a view in side elevation of an offshore platform according to the present invention.
Figure 2:
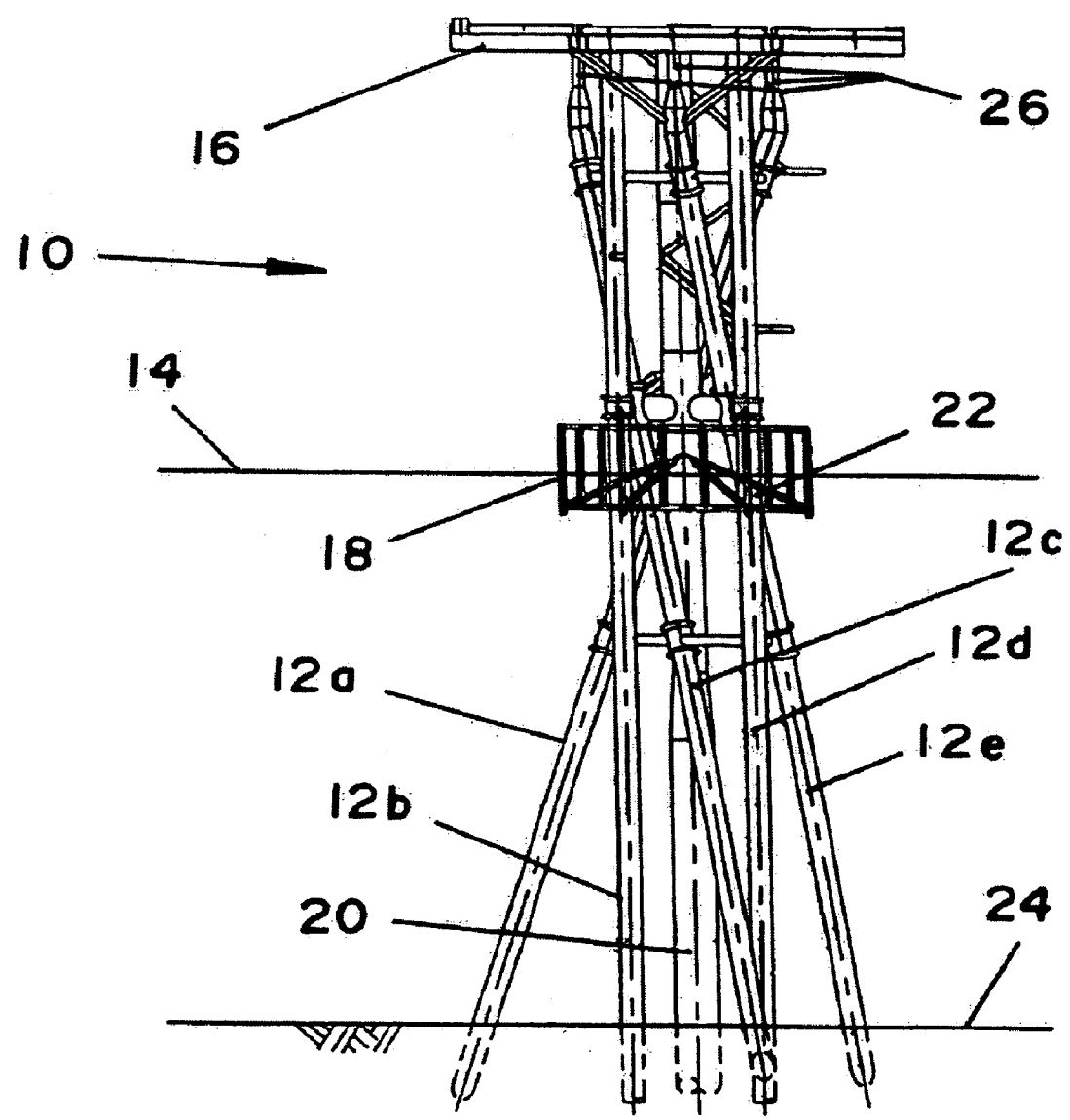
FIG. 2 is a view in front elevation of the offshore platform according to the present invention.

FIGS. 1 and 2 show an inward battered guide offshore platform indicated generally at 10 in which battered bracing piles 12a, 12c and 12e are arranged so as to minimize platform dimensions at the water surface 14 while maximizing the spacing of the piles as they extend upward from the water surface so that loads from a deck 16 at the top of the piles are transferred directly to the piling. For example, if three or more piles are employed to create the structure, they could be spaced apart 120 degrees. Piles 12b and 12d are conductor piles used in oil and gas platforms.

The platform includes a pile guide structure 18 which fits over and is connected to a central vertical member 20 to receive the piles 12a, 12c and 12e at the water surface. The piles extend angularly through guides 22 of the pile guide structure in such a manner that the distance between piles is minimized at the water surface, but the distances between angled piles is maximized both at the ends supporting the deck 16 as well as at the opposed end buried below the mudline 24. The pile guide connects the piles to act in unison to restrain lateral movement of the entire offshore platform 10 including the central vertical member 20.

The pile guide 18 also supports appurtenances such as ladders, boat landings, stairs, or the like, so that they can be installed in the field as a unit, thereby, for example, reducing installation expense for the platform. The legs 26 of the deck structure are connected to the tops of the piles. The increased pile spacing at the pile tops provides, for example, more structurally efficient support for the deck, reduced structural vibration periods for the platform and increased resistance to the rotation that results if the deck mass is eccentric to the central vertical member 20 than if the deck is supported by the central member. All field connections can be made above the water surface where structural integrity of the connections can be more easily verified than if the connections were made below the water surface.

Figure 3:
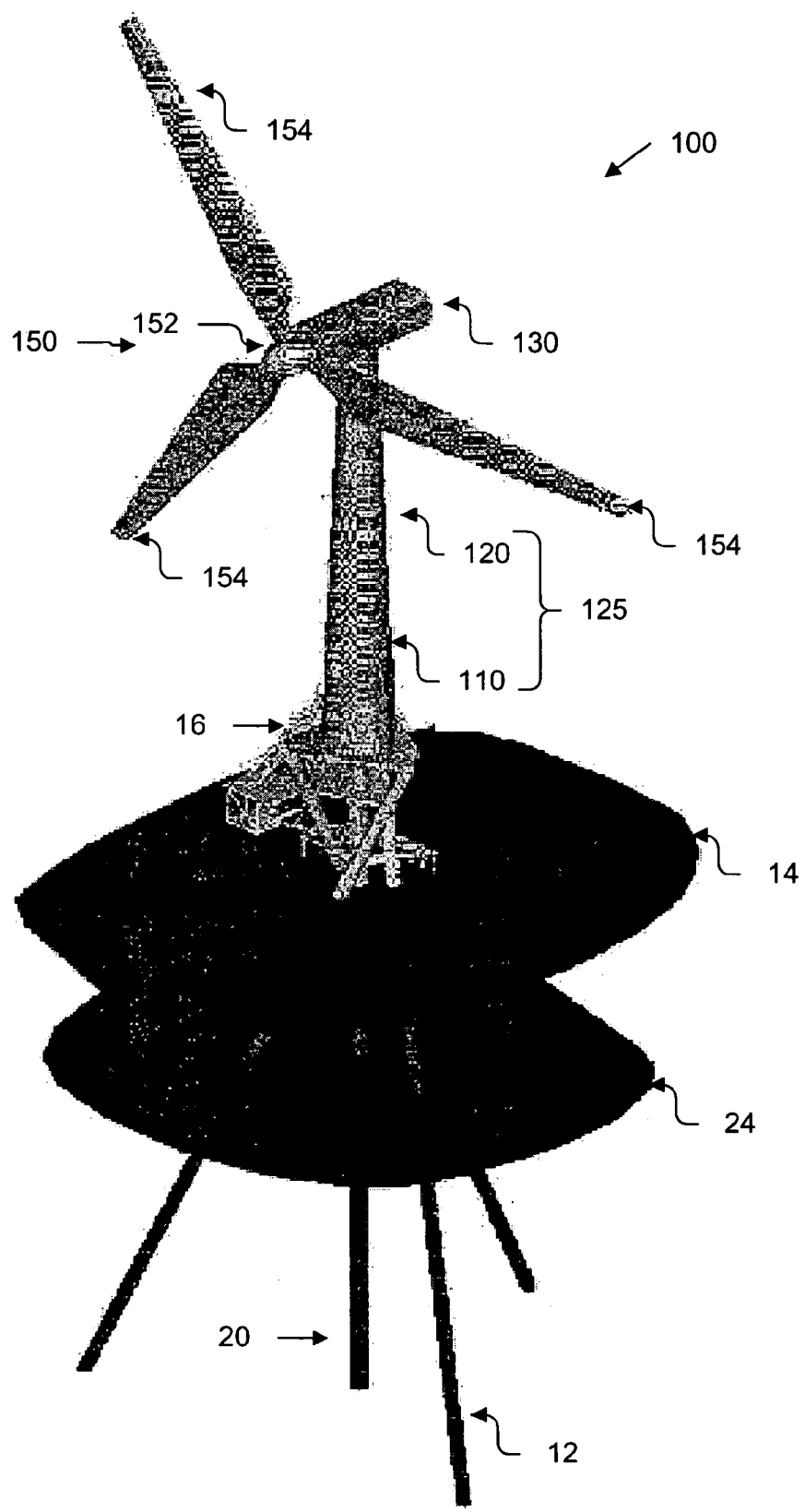
FIG. 3 is a perspective view of the offshore platform with a wind turbine placed on a deck of the platform according to the present invention.
Figure 4:
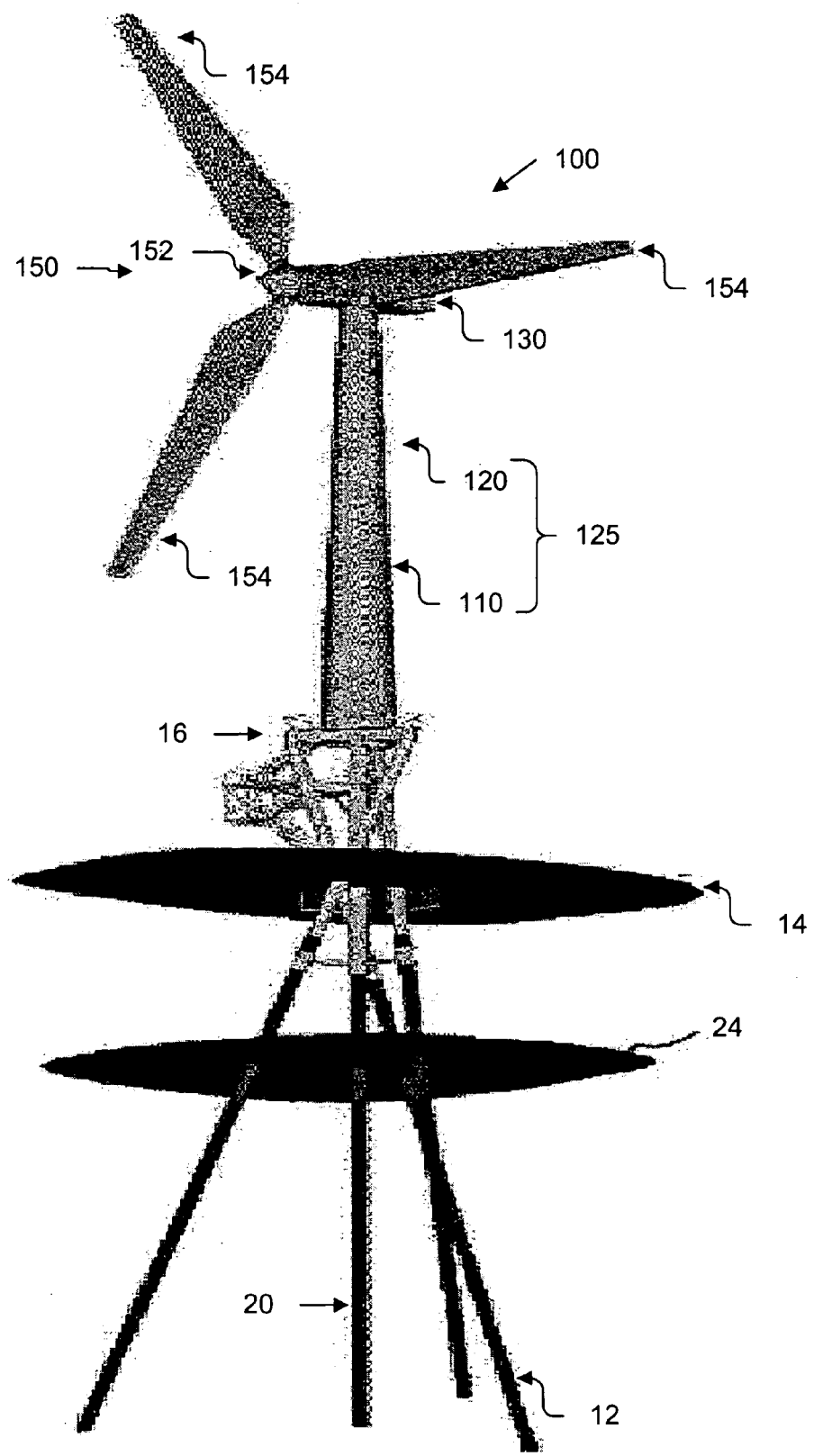
FIG. 4 is a side perspective view of the offshore platform with a wind turbine placed on the deck of the platform according to the present invention.

Once the piles 12a, 12c and 12e are in place, and the legs 26 and deck 16 are placed on the piles then, as shown in FIGS. 3 and 4, a wind turbine 100 can be installed. FIGS. 3 and 4 show two different perspective views of the wind turbine 100 when installed on the deck 16 of platform 10. The wind turbine 100 comprises: a base 125 including a lower section 110 and an upper section 120; a turbine element 130; and a blade mechanism 150 that comprises a rotor star 152 and individual blades 154. While the wind turbine described herein comprises a base 125 and three individual blades 154, other types of wind turbines can also be employed with the structure of FIG. 1, for example, in the manner described above. For example, a wind turbine with a single base part or having a multitude of parts that make up the base can be employed. Moreover, the wind turbine can also include more or a lesser number of blades as well as different types of blade mechanisms.

FIGS. 5–19 illustrate an exemplary method for assembling a the platform 10 and wind turbine 100 in accordance with an exemplary embodiment of this invention with, for example, a barge boat, around a substantially vertical member 20 such as SSC 50 (Self Sustaining Caisson). In this exemplary embodiment, the SSC 50 has been installed by an oil and gas drilling rig, such as a rig drilling an exploration well. The vertical member 20 (SSC 50) can either be installed when the platform is assembled or alternately, the remaining parts of the platform can be assembled around a previously erected vertical member. This enables the platform to be advantageously built on existing already used oil drill caissons or mono-piles to support oil and gas wells.

Figure 5:
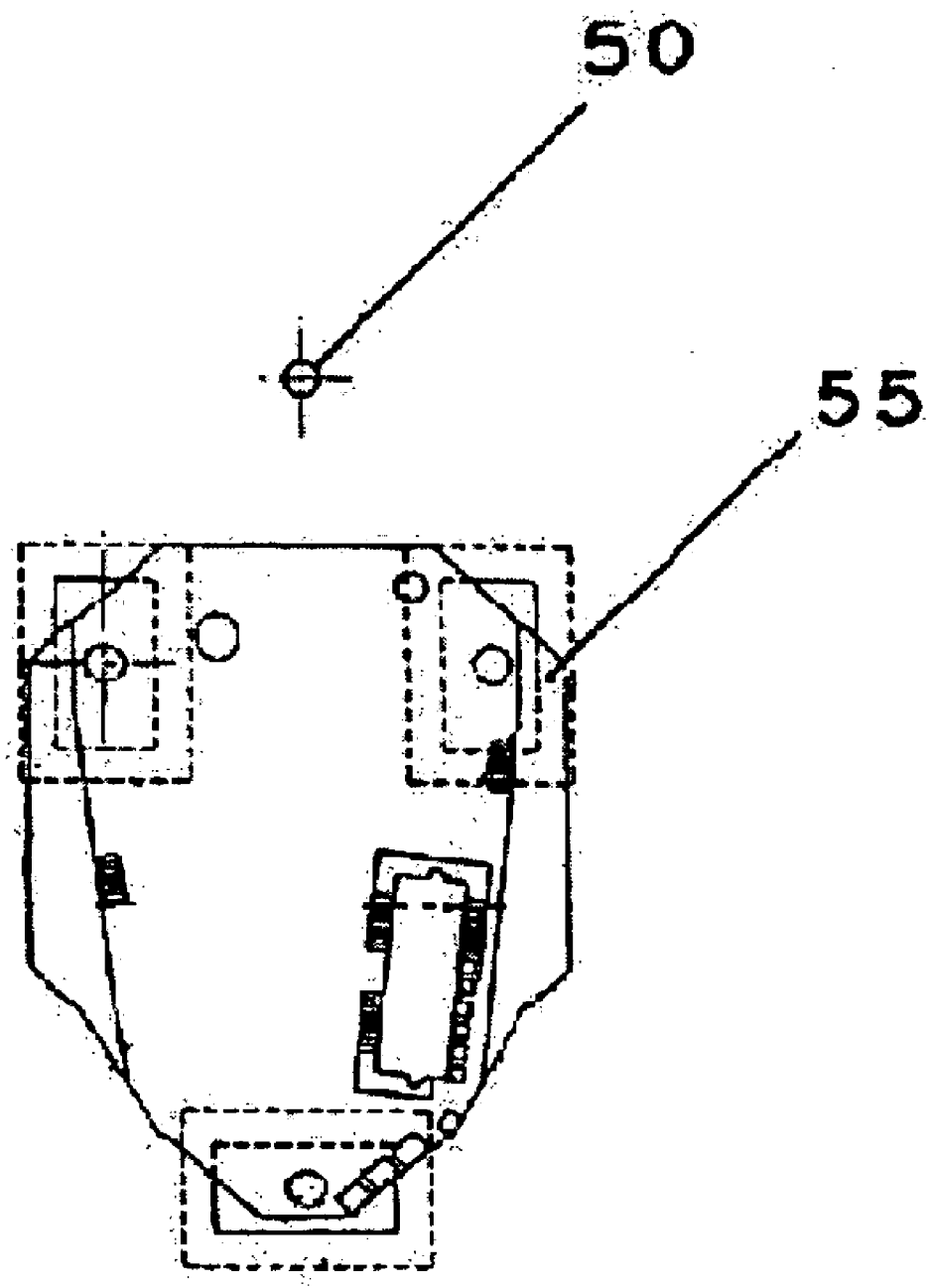
FIGS. 5–18 illustrate an exemplary method of assembling the offshore structure and wind turbine according to this invention.
Figure 6:
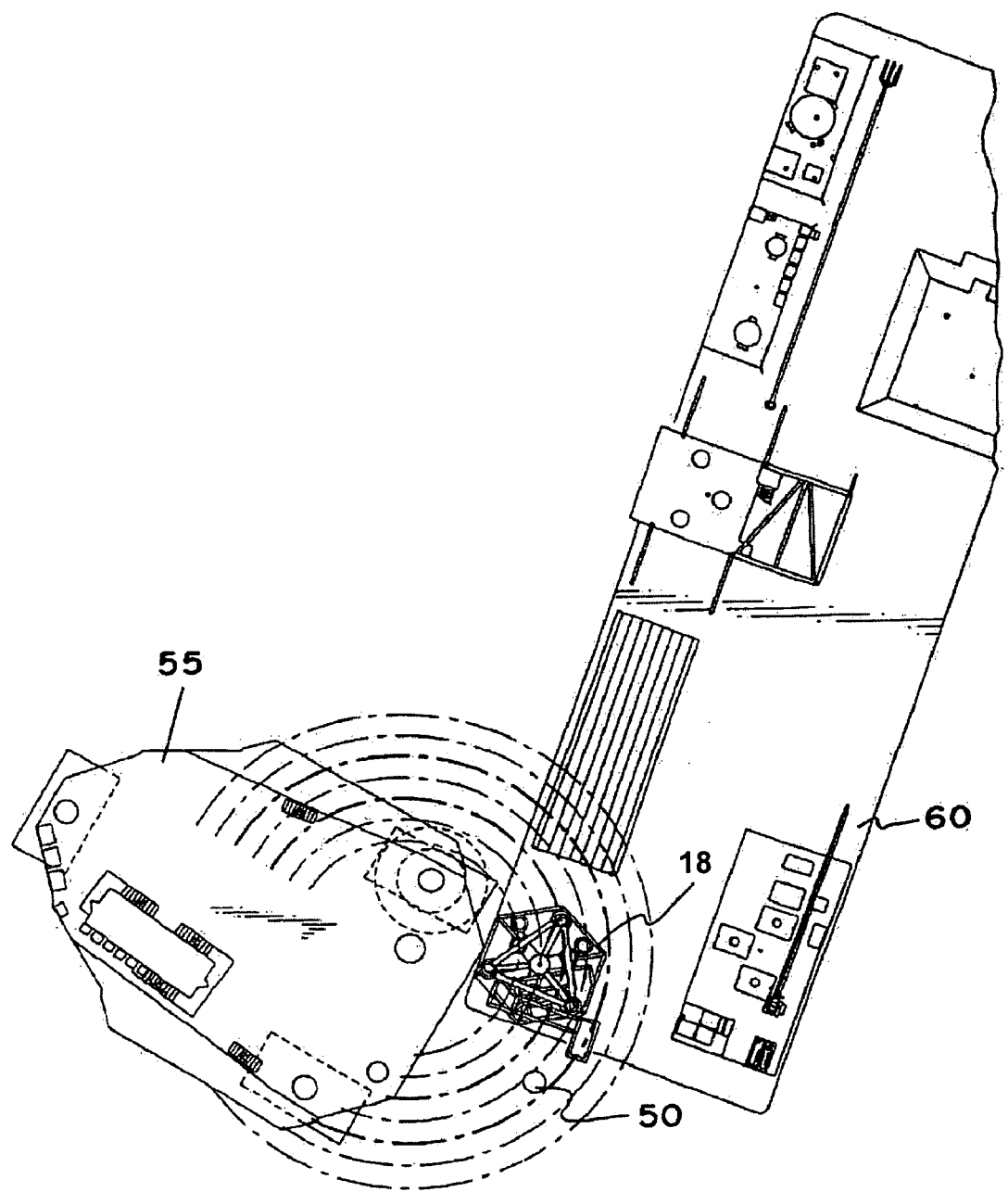
Figure 7:
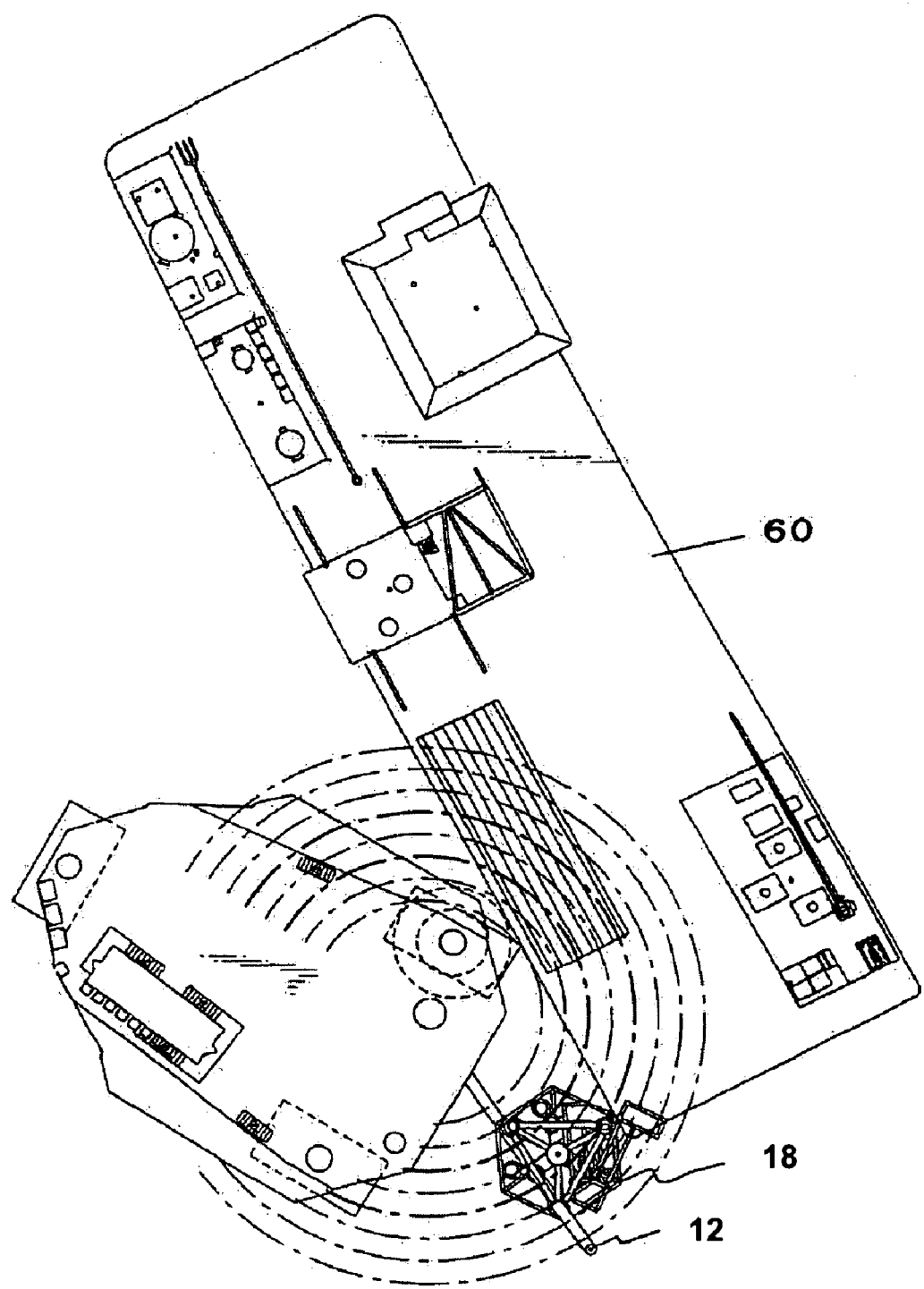
Figure 8:
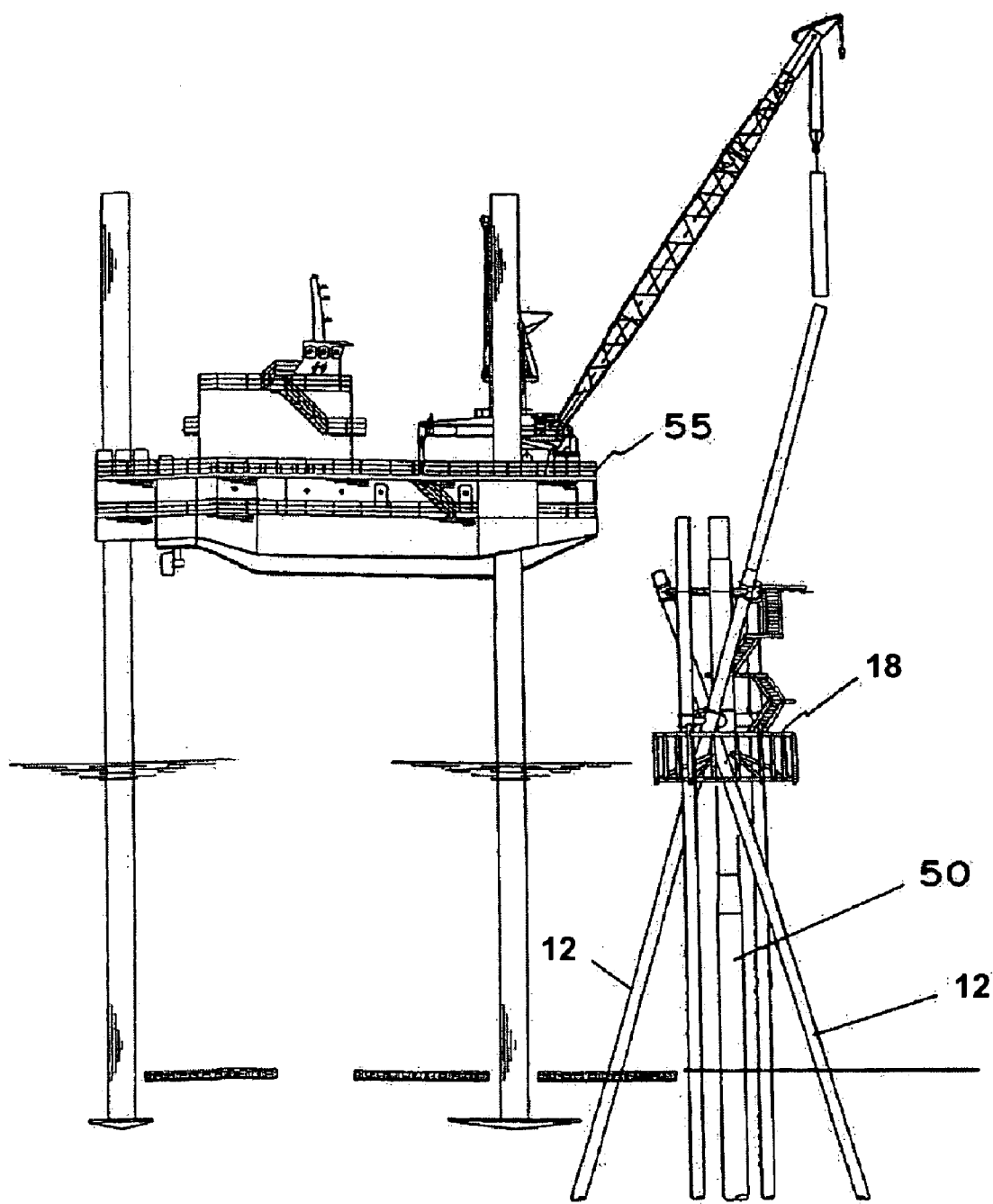

In FIG. 5, the position and orientation of the legs are determined and a lift boat 55 anchored and jacked-up relative to the installation point of the SSC 50. Next, as illustrated in FIG. 6, the guide structure 18 is unloaded from the barge 60. Then, as illustrated in FIG. 7, the piles 12a, 12c and 12e, are unloaded, placed in the guide structure, and in FIG. 8, installed via the guide structure into, for example, the ocean floor with the aid of a pile driving hammer (e.g., a hydraulic hammer). As can be seen from this illustration, the piles 12a, 12c and 12e intersect at a point just above the water line. This allows, for example, the piles and all associated connections to be made above water. However, one would also understand that the intersection point could also reside at or below the waterline.

Figure 9:
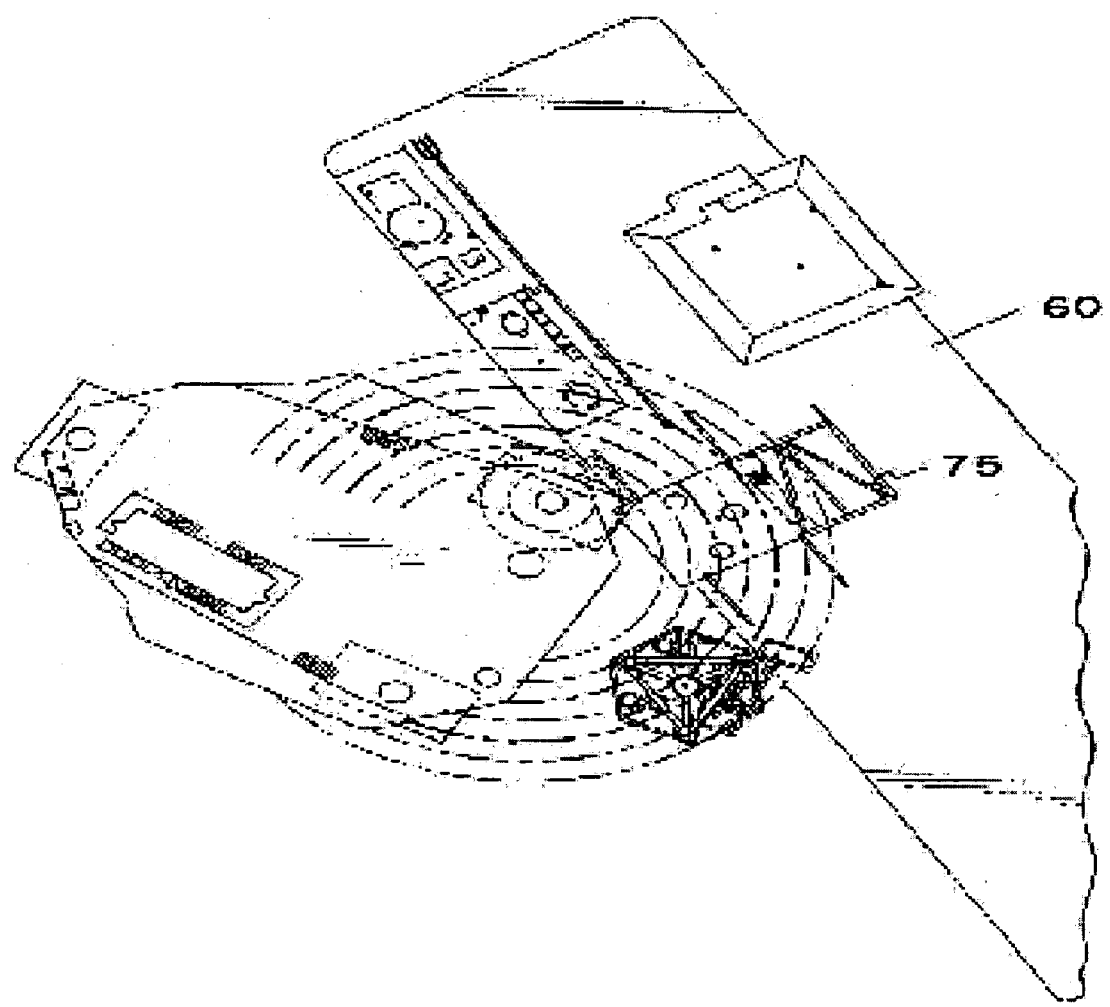
Figure 10:
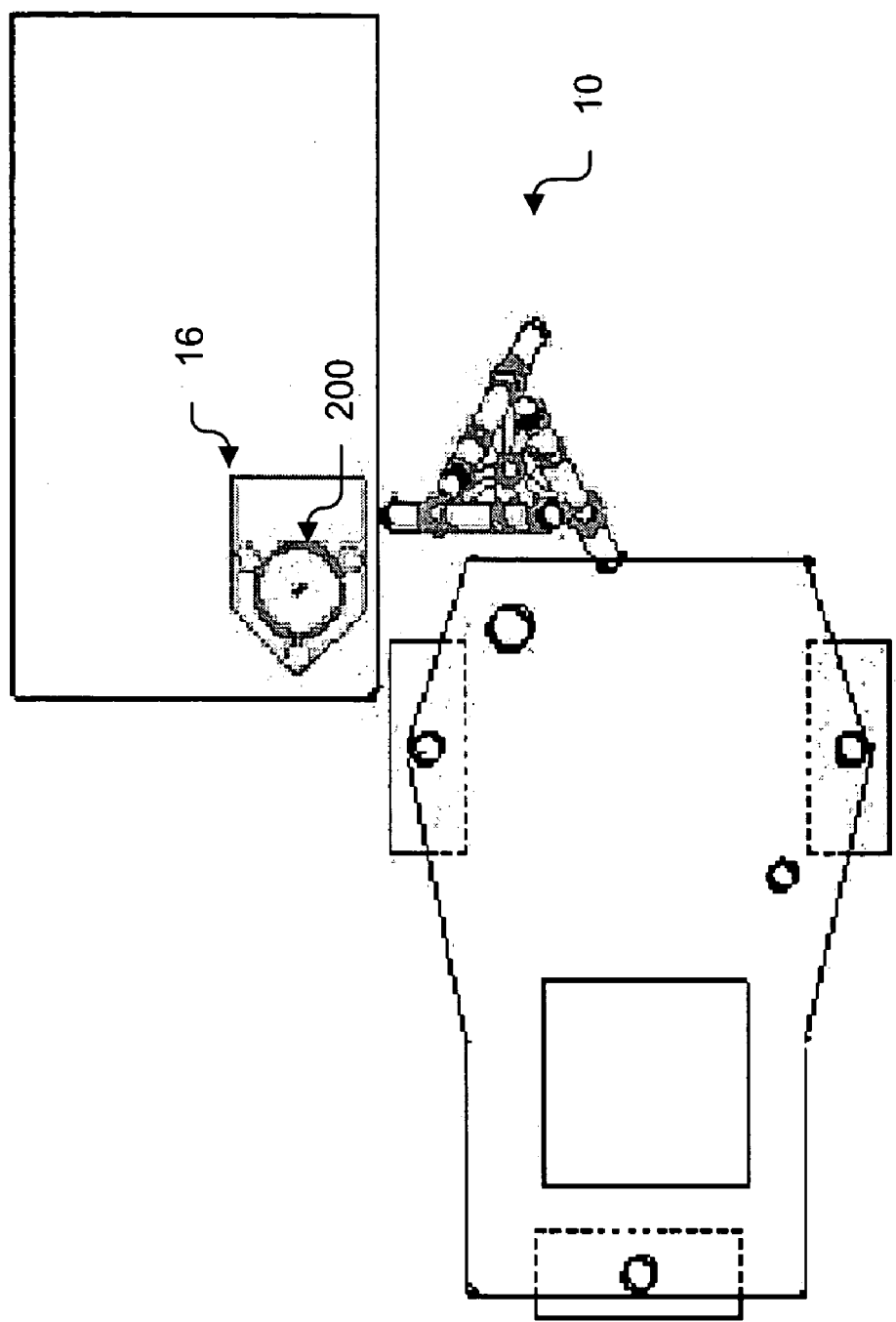
Figure 11:
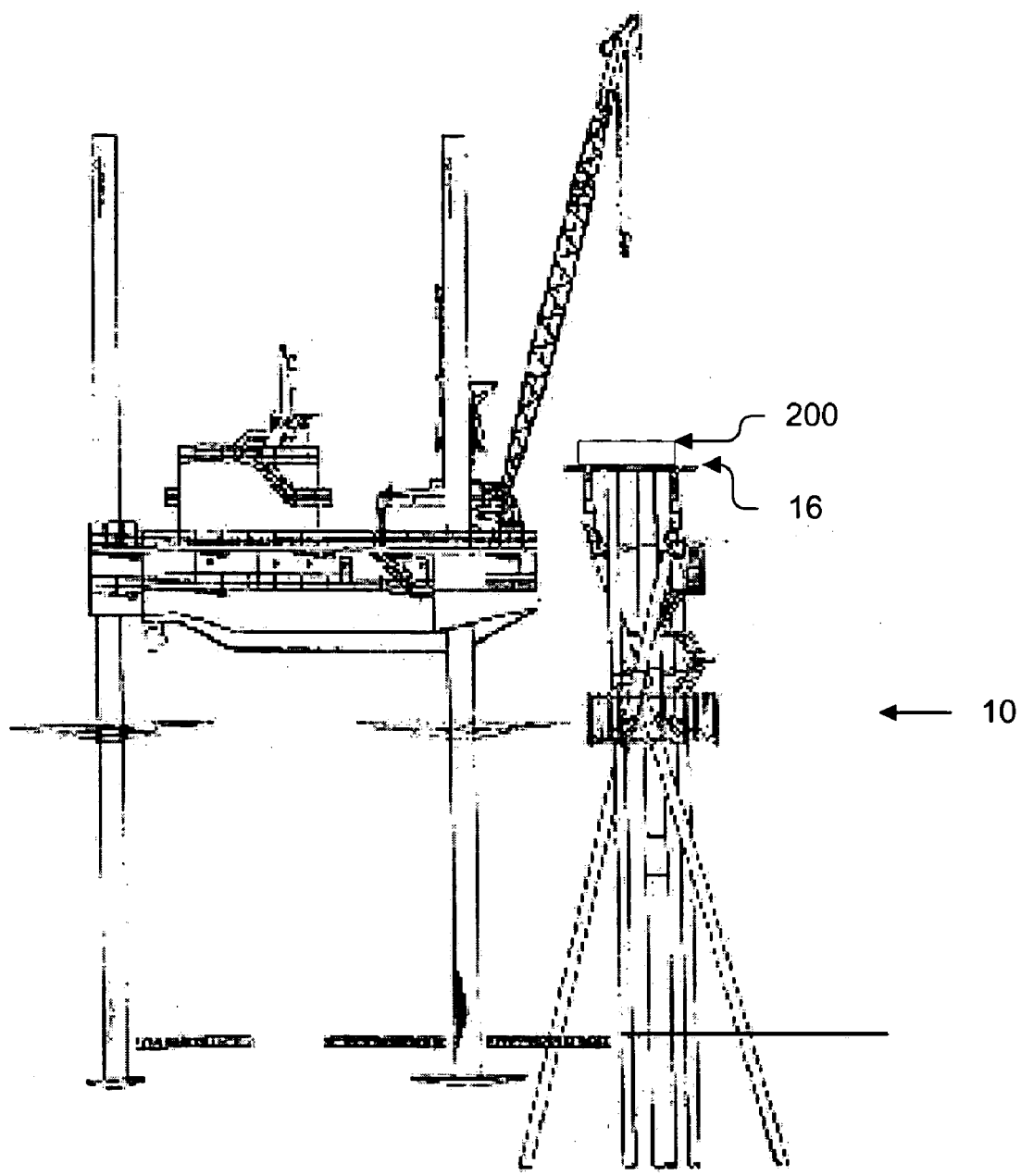
Figure 12:
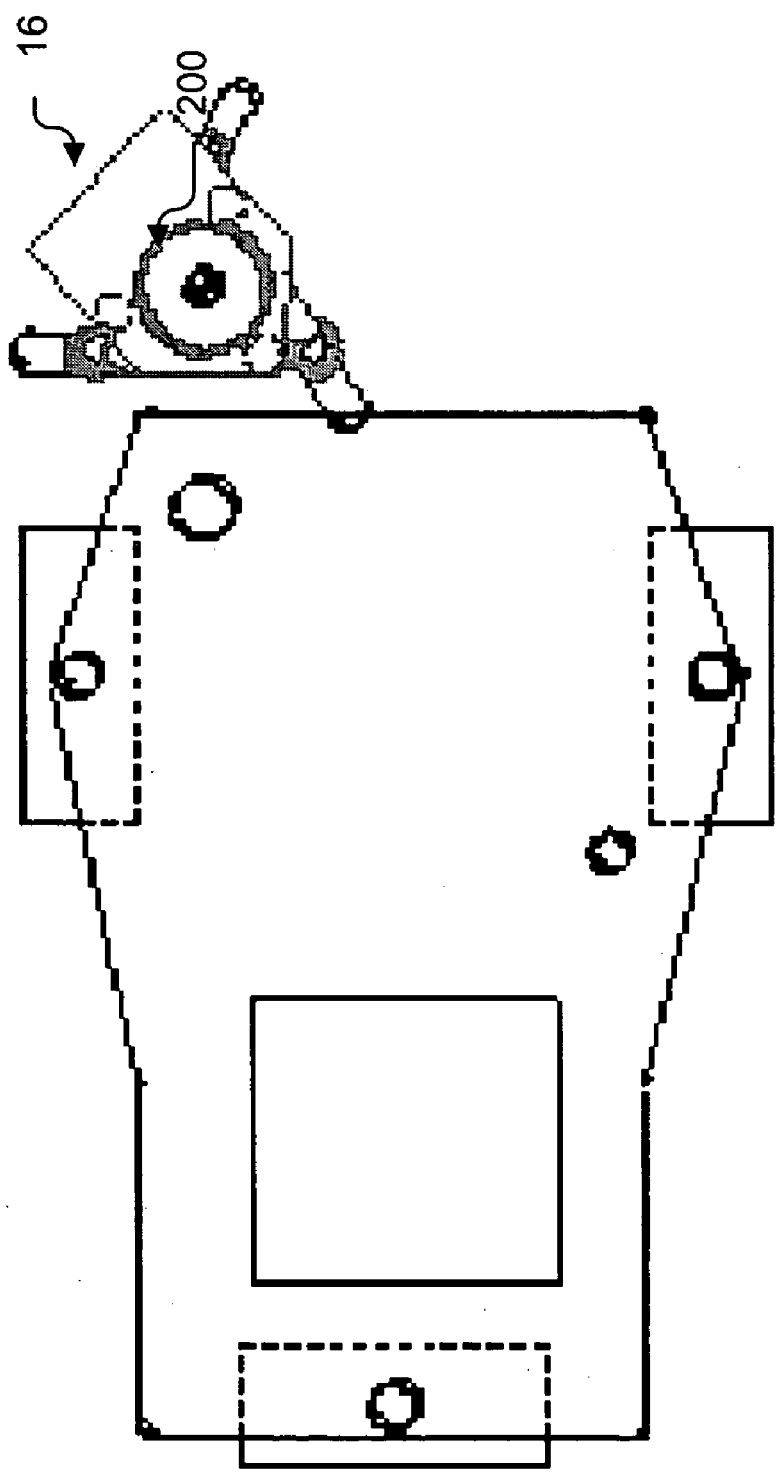

In FIG. 9, the barge 60 is relocated and the deck 16 is unloaded. In FIG. 10 the deck 16 including legs 26 are installed on the piles. In accordance with an exemplary embodiment of the invention, the deck can be modified to employ and support a wind turbine 100. Specifically to support the turbine a mounted flange can be built on the deck 16. The flange can be attached to the deck via bolting, grouting or welding. Although as illustrated in FIG. 10, the mounting flange 200 is shown being attached to the deck prior to placement on the legs 26, the mounting flange 200 could be installed after the deck has been installed. FIGS. 11 and 12 provide a side view and top view of the deck 16 and mounting flange 200 when installed.

Figure 13:
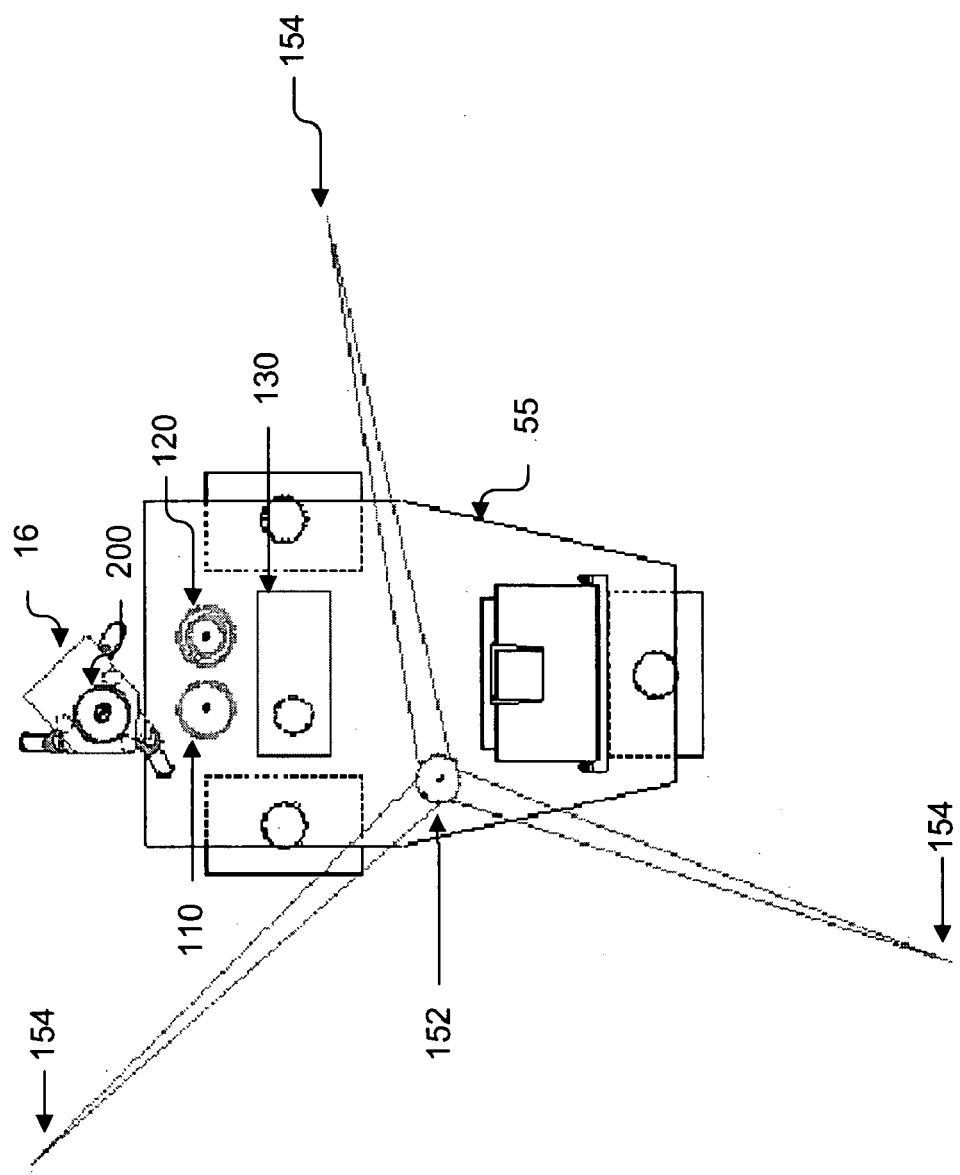
Figure 14:
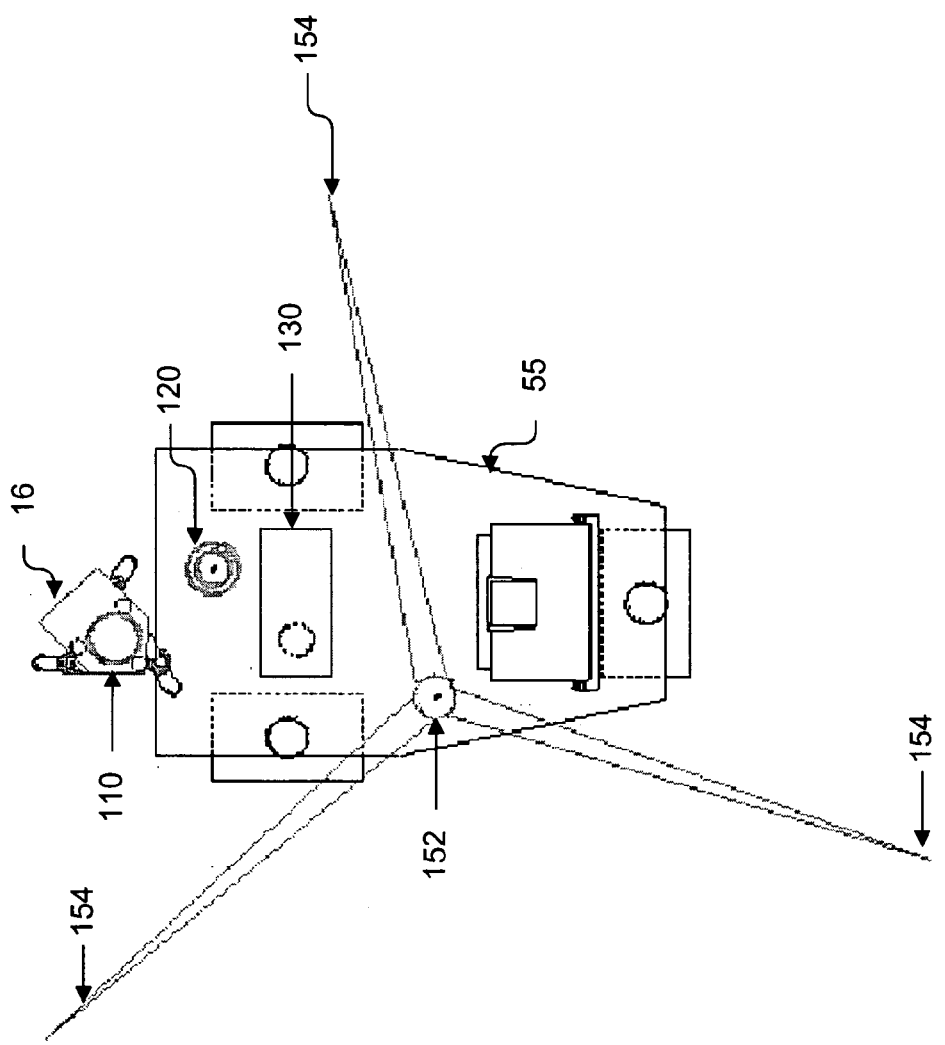
Figure 15:
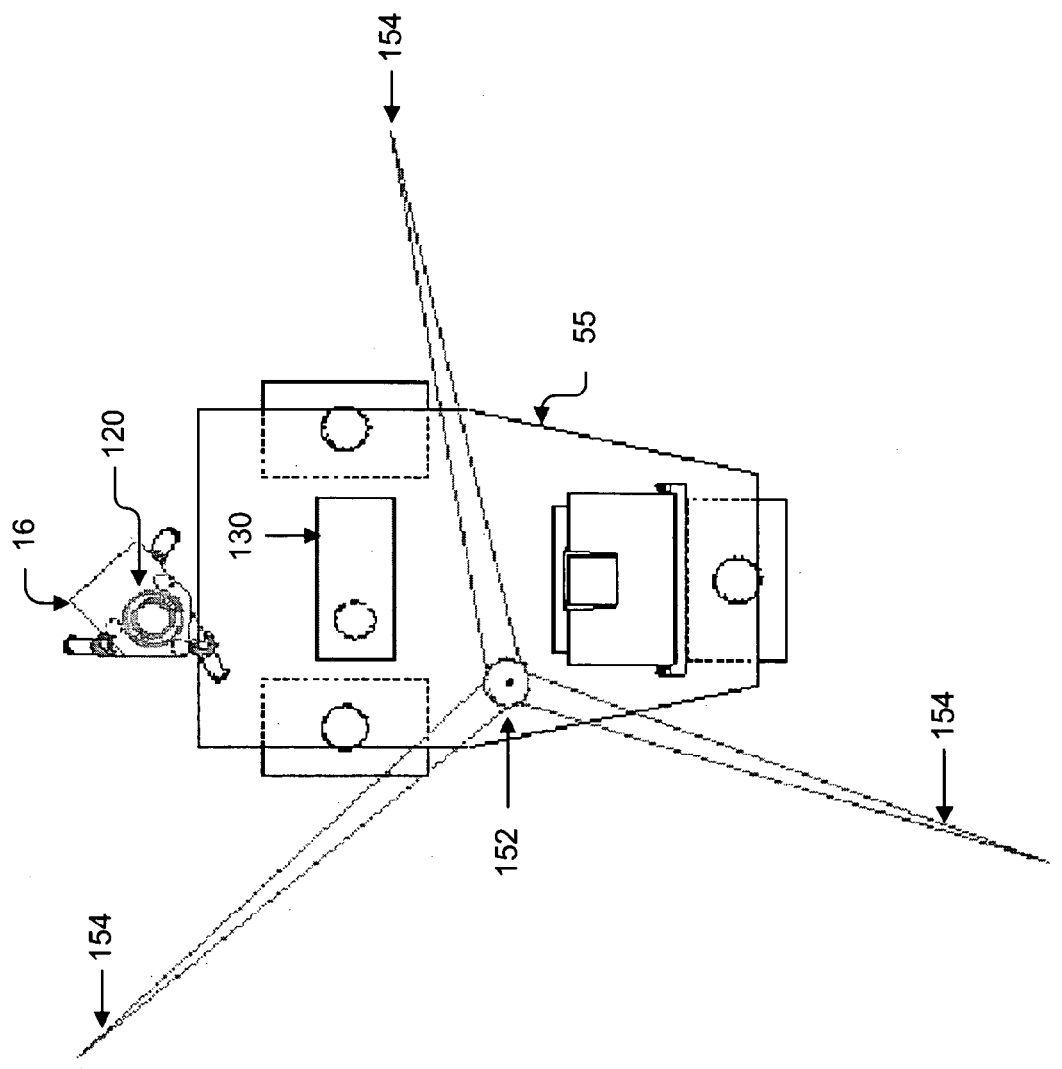
Figure 16:
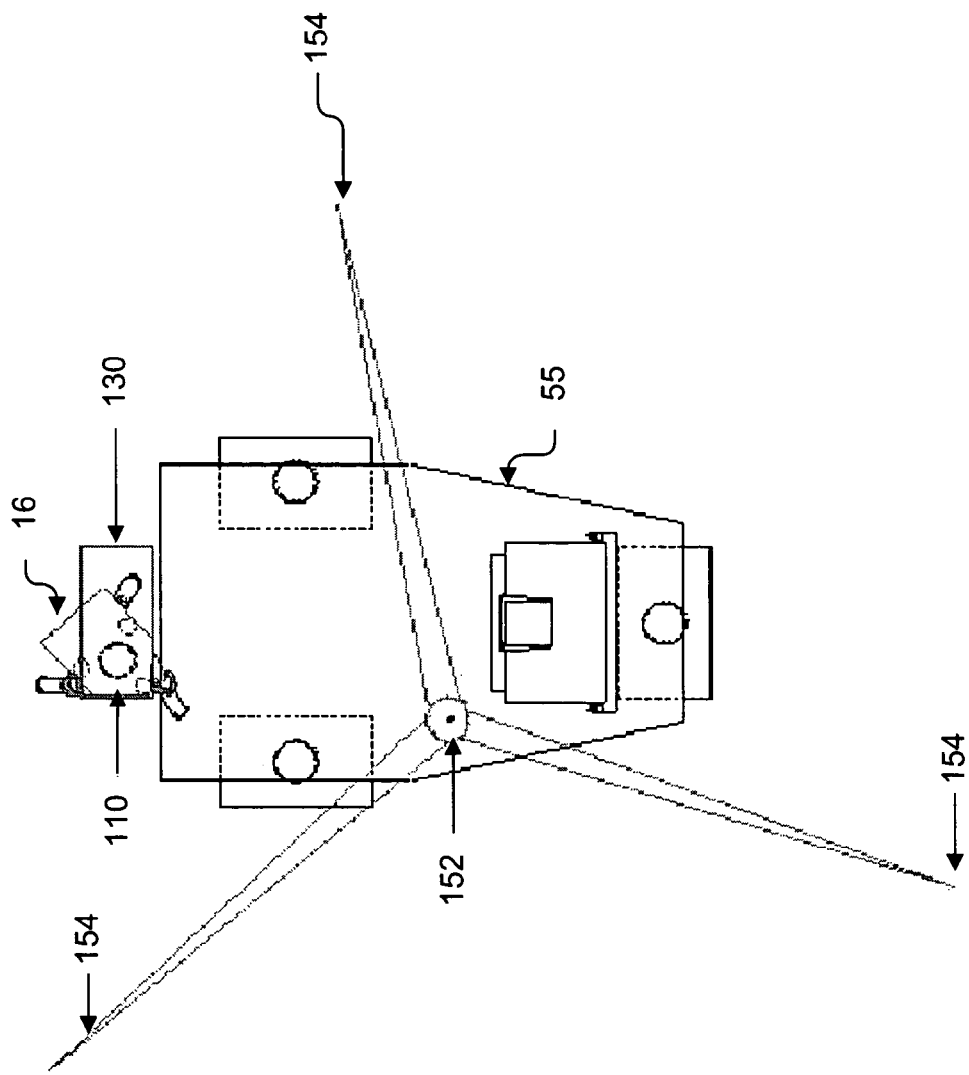

As illustrated in FIG. 13, once the mounting flange 200 is placed and set onto the deck 16, the tower lower section 110 is unloaded from the lift boat 55 and installed onto the mounting frame 200. Next, as illustrated in FIG. 14, the upper section 120 of the tower is unloaded and installed onto the tower lower section 110. Once the upper section 120 of the base has been installed, as illustrated in FIGS. 15 and 16, the turbine 130 is removed from the lift boat and attached to the upper section 120 of the tower.

As the tower lower section 110, tower upper section 120 and turbine 130 are installed, the blade mechanism 150 is readied for installation. The installation of this part of the wind turbine 100 can be performed in a plurality of different ways, in accordance with the present invention, as discussed below.

Figure 17:
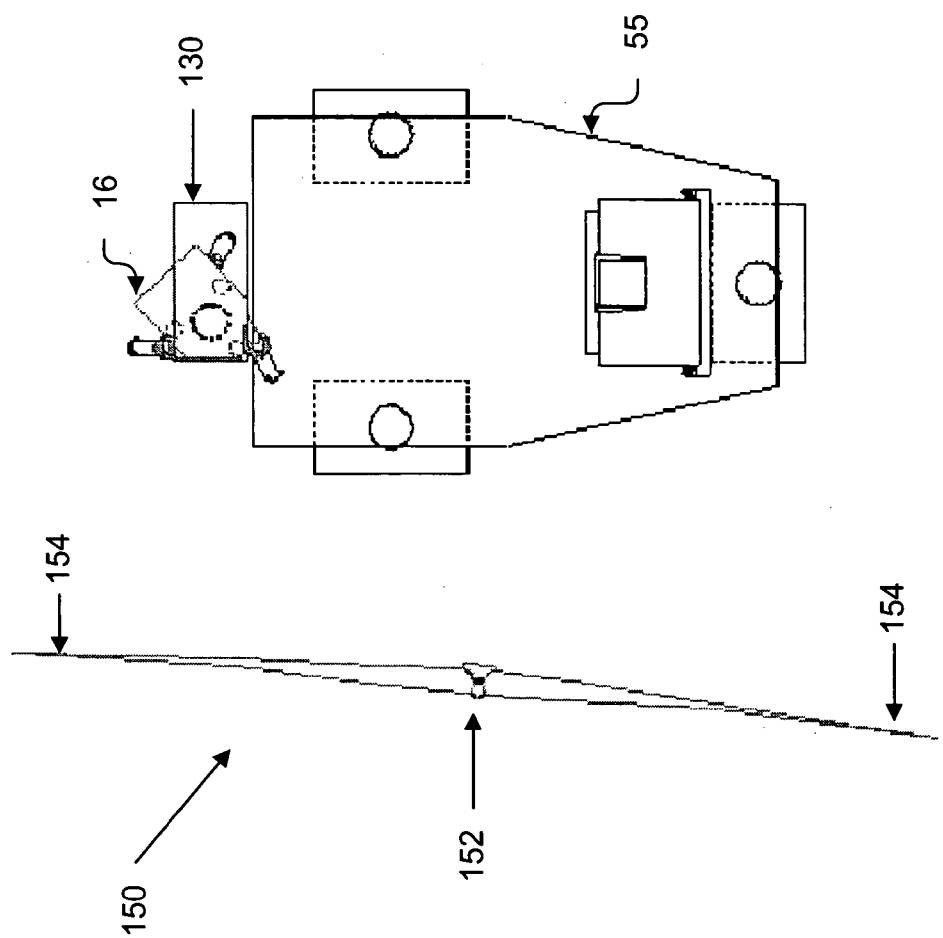
Figure 18:
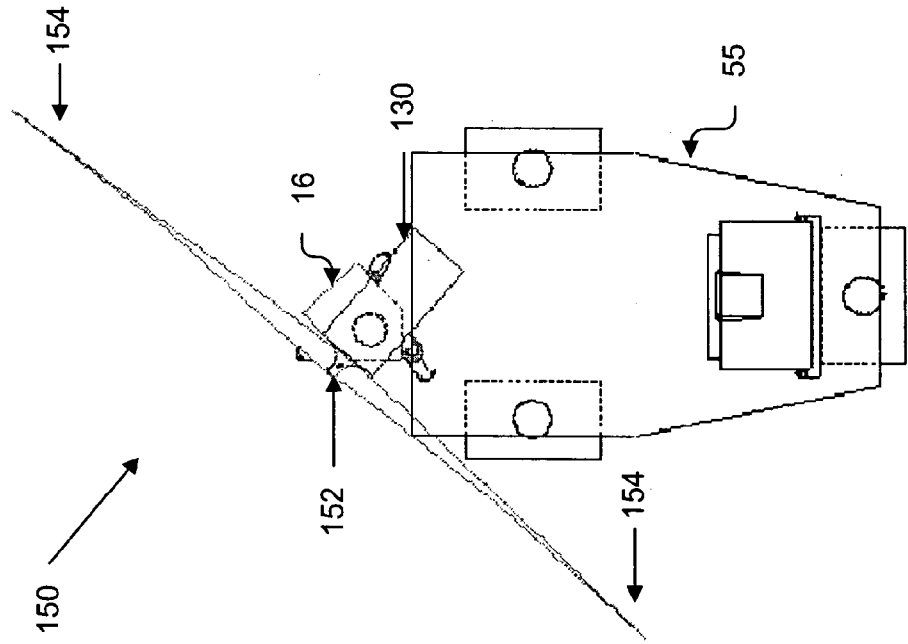

In accordance with one exemplary embodiment of the present invention, as illustrated in FIGS. 17 and 18, the complete, blade mechanism already fully assembled is unloaded from the lift boat 55 and attached to the turbine 130.

Figure 19:
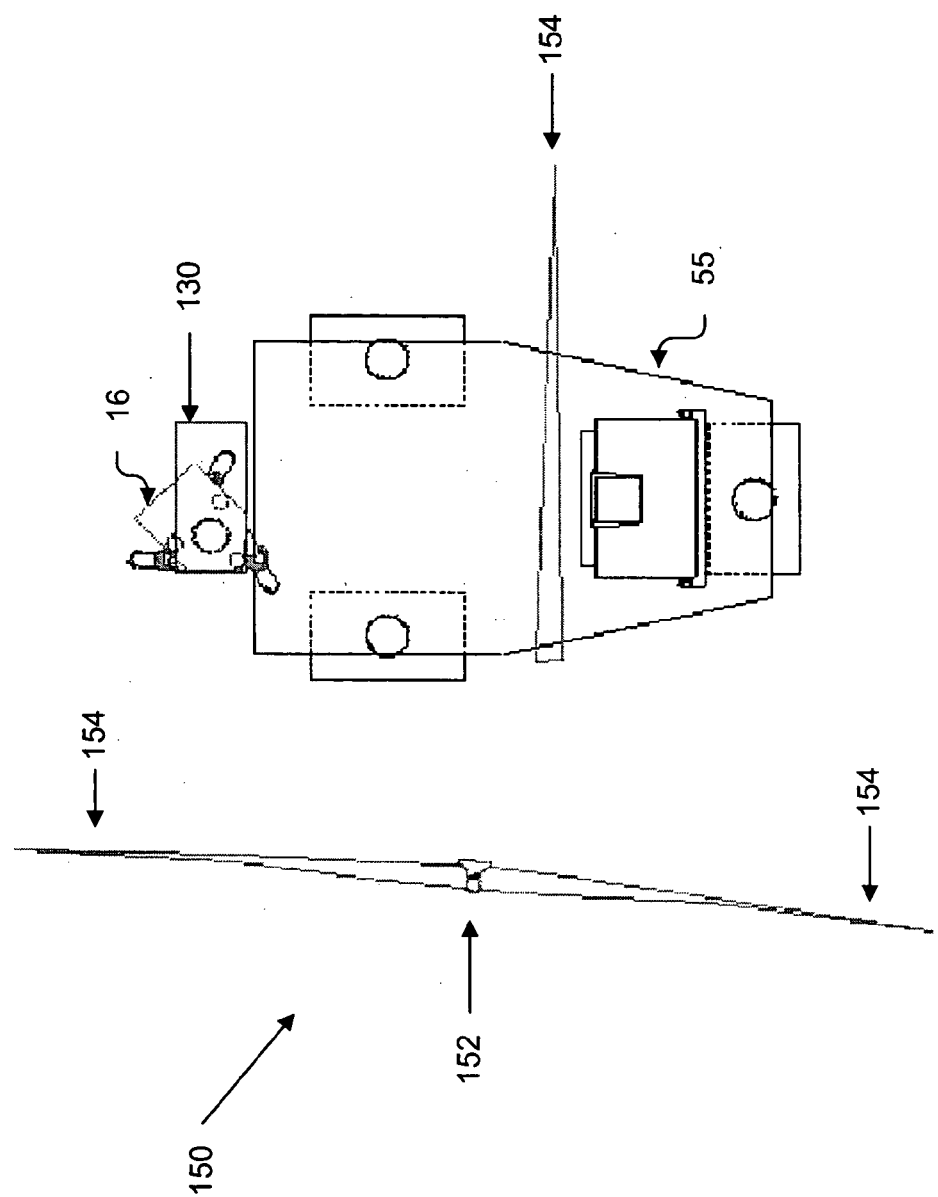
FIGS. 19–21 illustrate another exemplary method of assembling the offshore structure and wind turbine according to this invention.
Figure 20:
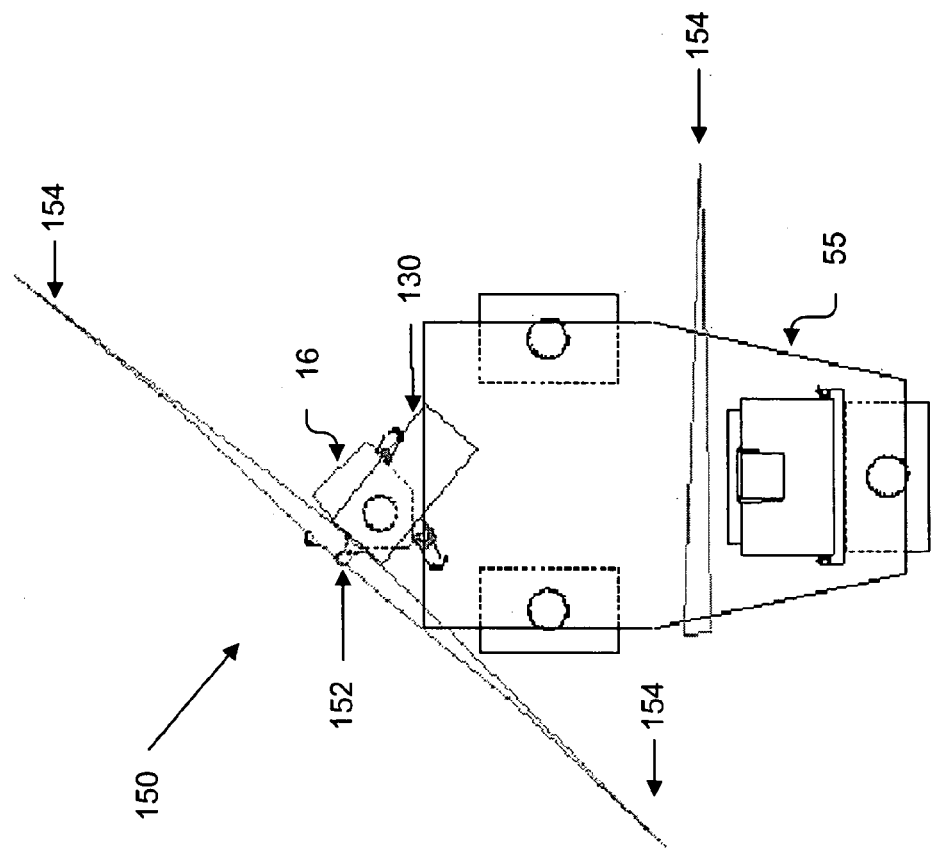
Figure 21:
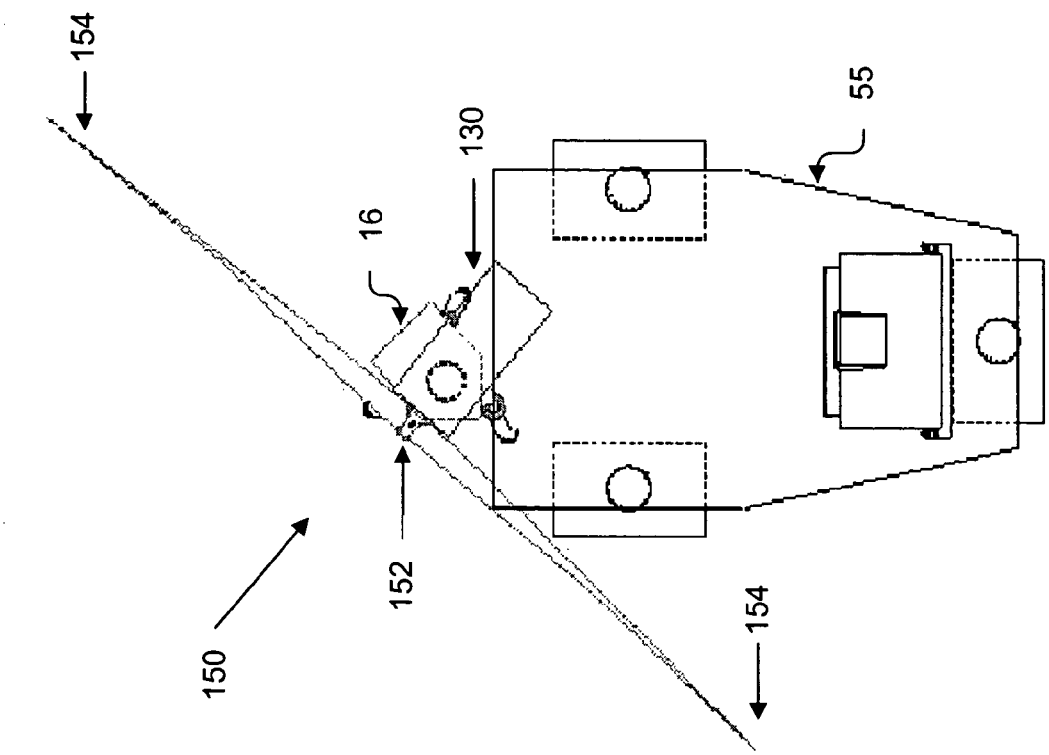

Alternatively, as illustrated in FIGS. 19–21, the blade mechanism does not need to be fully assembled prior to attachment to the turbine 130. This is advantageous for several different reasons. The blade mechanism, if fully assembled would require extra stowage area for transport to the assembly area. If, for example, only two of the blades were assembled, then to the rotor star, then the required space needed to transport the blade mechanism is reduced. Furthermore, if the remaining blade is not attached to the rotor star until it is already attached to the turbine, additional monetary savings can be achieved since the crane employed to attach the blade can be smaller. In FIG. 19, the blade mechanism having the two blades attached to the rotor star is raised (via a crane) and attached to the turbine (as illustrated in FIG. 20). Finally, in FIG. 21, the remaining blade 158 is attached to the rotor star. Again, FIGS. 3 and 4 provide a side views of the assembled wind turbine on the offshore structure support 10.

Figure 23:
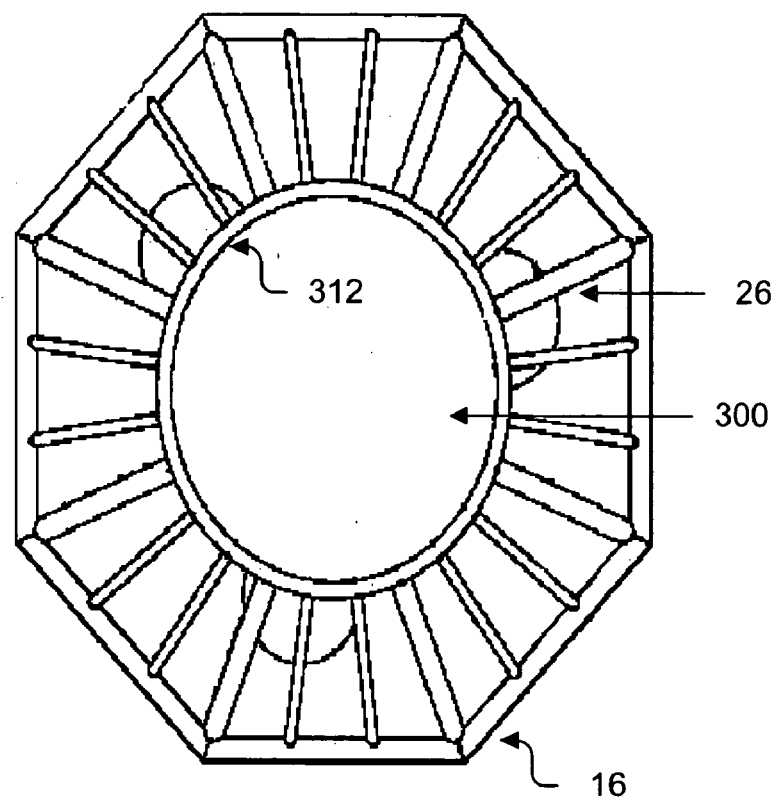
FIGS. 22 and 23 illustrate another exemplary offshore structure support foundation according to this invention.
Figure 22:
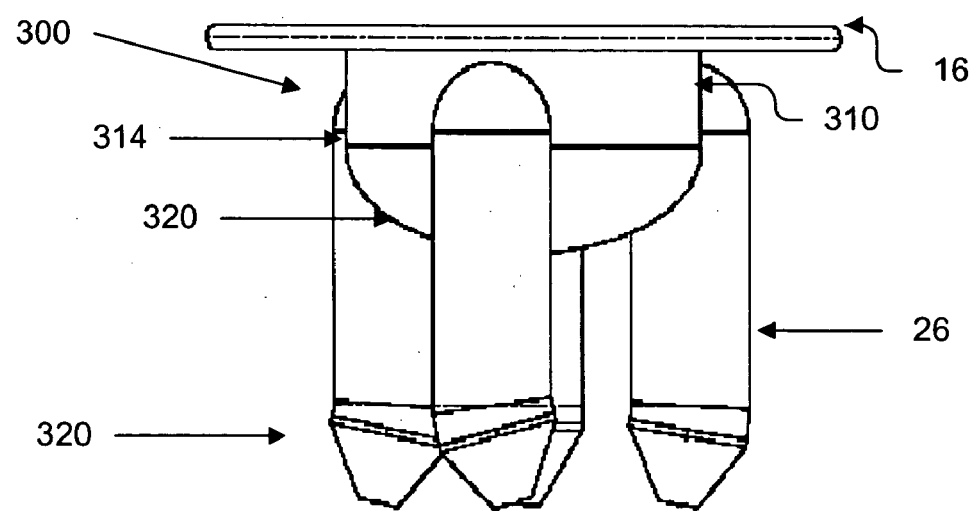

In accordance with another exemplary aspect of the present invention, a deck and associated mounting flange 300 is provided to receive a wind turbine, as illustrated in FIGS. 22 and 23. Specifically, the mounting flange 300 includes a body 310 and an elliptical (or spherical) head 320 extending below deck 16. The body 310 is circular and includes a deck end 312 and a head end 314 portion. A wind turbine 100 is able to be attached to the foundation body 310 at the deck end 312 of the foundation body, via bolting, for example. The foundation body 310 is also able to receive legs 26 that are connected to the batter bracing piles 12a, 12c and 12e. Note that four piles are illustrated in FIG. 22.

The elliptical (or spherical) head 320 is attached to the foundation body 310 at its deck leg connection end and enables the turbine foundation 300 a more fatigue resistant connection at the deck leg. For this same reason, as illustrated in FIG. 22, the ends of the legs 26 also employ a curved surface. By making the intersection between the foundation body 310 and the elliptical (or spherical) head 320 as well as foundation body 310 and the elliptical shape of the legs 26, a continuously curved intersection is provide and a sharp corner is avoided. As a result, hot spot stresses are reduced on the joints.

Additionally in accordance with the present embodiment discussed with regard to FIGS. 22 and 23, the deck 16 includes structural support elements extending from the deck end of the turbine foundation to the edge of the deck 16. While the deck 16 in the embodiment shown in FIG. 23 is illustrated as octagonal, one could understand that the deck could be made to be other shapes also, (e.g., hexagonal, rectangular, circular, or the like).

In accordance with another aspect of the present invention, the natural period of the offshore support structure can be adjusted to avoid the excessive vibration of the wind turbine while operating that would result if the natural period of the support structure was too close to matching the rotational period of the turbine. This tuning of the natural period can be accomplished by changing the size of the components of the support structure, by increasing or decreasing the batter of the piles, adjusting the spacing of the piles and/or by raising or lowering the elevations where the piles are laterally supported. The extent and combination of tuning measures required vary depending on the design and operational characteristics of the wind turbine and the water depth, meteorological and oceanographic conditions and soil characteristics at the location.

For example, a typical three blade wind turbine is controlled by adjusting blade pitch to make one rotation about every 4.5 seconds in most wind conditions. Therefore, for a typical wind turbine one of the three blades would than pass the wind turbine support tower every 1.5 seconds. To avoid the wind turbine rotational periods and limit potential for destructive resonance, frequency forbidden zones are established for the natural frequency of the entire support structure. For a typical wind turbine the forbidden natural frequency zones could be 0.18 Hz to 0.28 Hz and 0.50 Hz to 0.80 Hz. Likewise, the target natural frequency would be 0.30 Hz to 0.33 Hz and higher order natural frequencies should be above 0.80 Hz. If computed eignfrequencies are in a forbidden zone tuning will be necessary. Tuning can then be accomplished in the manner discussed above.

It is, therefore, apparent that there has been provided, in accordance with the present invention, a support and method for assembling a wind turbine for placement on an offshore support structure. While this invention has been described in conjunction with a number of illustrative embodiments, it is evident that many alternatives, modifications, and variations would be or are apparent to those of ordinary skill in the applicable arts. Accordingly, the disclosure is intended to embrace all such alternatives, modifications, equivalents and variations that are within in the spirit and scope of this invention.

I claim:

1. A wind turbine in combination with a structure support comprising:
   a wind turbine comprising a base;
   a structure support, said structure support further comprising
      at least three elements configured in a substantially teepee shaped configuration, wherein the at least three elements encompassing a vertical member;
      a first end of the at least three elements capable of being affixed to a structure; and
      a second end of the at least three elements adapted to be in contact with a surface, wherein the at least three elements intersect between the first end and the second end;
   a mounting frame connecting the structure support to the wind turbine; and
   a deck on which the mounting frame is fastened;
   wherein said mounting frame includes a foundation body and an elliptical head extending below the deck.

2. The structure of claim 1, wherein the surface is a sea floor and the second end extends below a mudline.

3. The support of claim 1, where the at least three elements intersect above a waterline or at a waterline.

4. The support of claim 1, wherein an angular guide maintains an orientation at least between the at least three elements.

5. The support of claim 1, wherein the at least three elements are offset from each other by 120°.

6. The support of claim 1, wherein the wind turbine further comprises a blade mechanism.

7. The support of claim 1, wherein the wind turbine further comprises a turbine element placed on the base and connecting to the blade mechanism.

8. A method of constructing a wind turbine on a structure support comprising:
   providing at least three legs in a teepee configuration;
   placing an first end of the first three legs on a surface;
   affixing a deck to a second end of the at least three legs;
   affixing a wind turbine mounting flange to the structure;
   affixing a base to the mounting frame;
   affixing a turbine element to the mounting frame;
   affixing a blade mechanism to the turbine; and
   tuning the natural period of the wind turbine so that the wind turbine and structure operate at a predetermined frequency, wherein the natural period is tuned by adjusting the spacing between the three legs.

9. The method of claim 8, wherein the structure is located at a position above an intersecting point of the at least three legs.

10. The method of claim 8, wherein a guide structure is used to orient the at least three legs.

11. The method of claim 8, wherein the three legs are attached to the mounting frame.

12. A method of constructing a wind turbine on a structure support comprising:
   providing at least three legs in a teepee configuration;
   placing an first end of the first three legs on a surface;
   affixing a deck to a second end of the at least three legs;
   affixing a wind turbine mounting flange to the structure;
   affixing a base to the mounting frame;
   affixing a turbine element to the mounting frame; and
   affixing a blade mechanism to the turbine;
   wherein the mounting frame includes a foundation body and an elliptical head, and wherein the three legs are attached to the foundation body of the elliptical head.

* * * * *